(12) United States Patent
Aumann et al.

(10) Patent No.: US 6,659,776 B1
(45) Date of Patent: Dec. 9, 2003

(54) PORTABLE LAPAROSCOPIC TRAINER

(75) Inventors: Robert J. Aumann, Mason, OH (US); David R. Brahm, Cincinnati, OH (US)

(73) Assignee: 3-D Technical Services, Inc., Franklin, OH (US)

( * ) Notice: Subject to any disclaimer, the term of this patent is extended or adjusted under 35 U.S.C. 154(b) by 213 days.

(21) Appl. No.: 09/749,321

(22) Filed: Dec. 28, 2000

(51) Int. Cl.⁷ .............................................. G09B 23/28
(52) U.S. Cl. ........................ 434/262; 434/267; 434/272
(58) Field of Search ................................ 434/118, 219, 434/258, 260, 262, 267, 268, 272, 273, 307 R, 308, 365; 128/898; 600/37, 205; 606/1; 345/184, 473; 318/566; 340/407.1

(56) References Cited

U.S. PATENT DOCUMENTS

| | | | | |
|---|---|---|---|---|
| 5,403,191 A | * | 4/1995 | Tuason .......................... 434/262 |
| 5,620,326 A | * | 4/1997 | Younker ......................... 434/268 |
| 5,722,836 A | * | 3/1998 | Younker ......................... 434/258 |
| 5,766,016 A | * | 6/1998 | Sinclair et al. ............ 340/407.1 |
| 5,800,179 A | * | 9/1998 | Bailey ........................... 434/262 |
| 5,882,206 A | * | 3/1999 | Gillio ............................ 434/262 |
| 5,976,156 A | * | 11/1999 | Taylor et al. ................. 606/130 |
| 6,113,395 A | * | 9/2000 | Hon .............................. 434/262 |
| 6,377,011 B1 | * | 4/2002 | Ben-Ur ......................... 318/566 |
| 6,447,443 B1 | * | 9/2002 | Keogh et al. ................. 128/898 |
| 6,468,265 B1 | * | 10/2002 | Evans et al. ..................... 606/1 |

* cited by examiner

*Primary Examiner*—Joe H. Cheng
(74) *Attorney, Agent, or Firm*—Neal O. Willmann

(57) ABSTRACT

Disclosed herein is a portable device designed to be used for the training and practice of video-laparoscopic surgical techniques. The device permits practicing surgical techniques that closely simulate actual surgical situations by capturing the surgical work area on a self-contained video camera or digital imaging device and transmitting the captured image to a television monitor, LCD screen or computer, thus allowing the surgical technique to be viewed remotely as well as permitting the procedure to be recorded, and viewed and critiqued later.

3 Claims, 1 Drawing Sheet

PORTABLE LAPAROSCOPIC TRAINER

BACKGROUND OF THE INVENTION

This disclosure relates generally to a device or apparatus to facilitate the practice of surgical techniques on simulated tissue. More specifically, the disclosed device is designed to approximate a laparoscopic surgical theater and to allow the surgical instructor or trainee to demonstrate or practice a variety of laparoscopic techniques while having said techniques recorded and transmitted for viewing by the practitioner and/or a broad viewing audience.

DESCRIPTION OF THE PRIOR ART

Laparoscopic surgical simulators are well-known and accepted by practitioners in the art, and these devices are well-represented in the patent literature. For instance, U.S. Pat. No. 5,403,191, issued Apr. 4, 1995 to Tuason discloses a rather elaborate apparatus employing an endoscopic video monitoring system and a pair of reflecting mirrors affixed to the upper rim of the device to provide additional perspectives and dimensions to the endoscopic image.

More recently, U.S. Pat. No. 5,722,836, dated Mar. 3, 1998 to Younker discloses a videoendoscopic surgical training system employing, ideally, a pair of mirrors mounted on the internal walls of the trainer. The trainer is configured in a way that shields the practicing surgeon from having a direct view of the work area, but, with the benefit of the internally positioned mirrors, he is apparently able to experience the perspectives and conditions of an actual surgery.

SUMMARY OF THE INVENTION

Notwithstanding the practical functionality and professional acceptance accorded training devices such as those described, supra, the desire for the apparent contradiction of pairing a simpler design with more sophisticated laparoscopic training capability has prompted the development of the presently disclosed device, which can succinctly be described as follows: A portable surgical training device, ideally suited for teaching and learning laparoscopic surgical techniques comprises essentially an enclosed box or container having at least a pair of portals for inserting and manipulating surgical instruments. Within the box is a work area for the placement of simulated tissue samples for the practice and perfection of surgical techniques by the manipulator of the surgical instruments. Also within the confines of the enclosed box is a video camera situated to focus on the simulated tissue on the work area so that it can capture, record and transmit the activity transpiring on the work area to a remote viewing means.

DESCRIPTION OF THE PREFERRED EMBODIMENT

Figure 1:
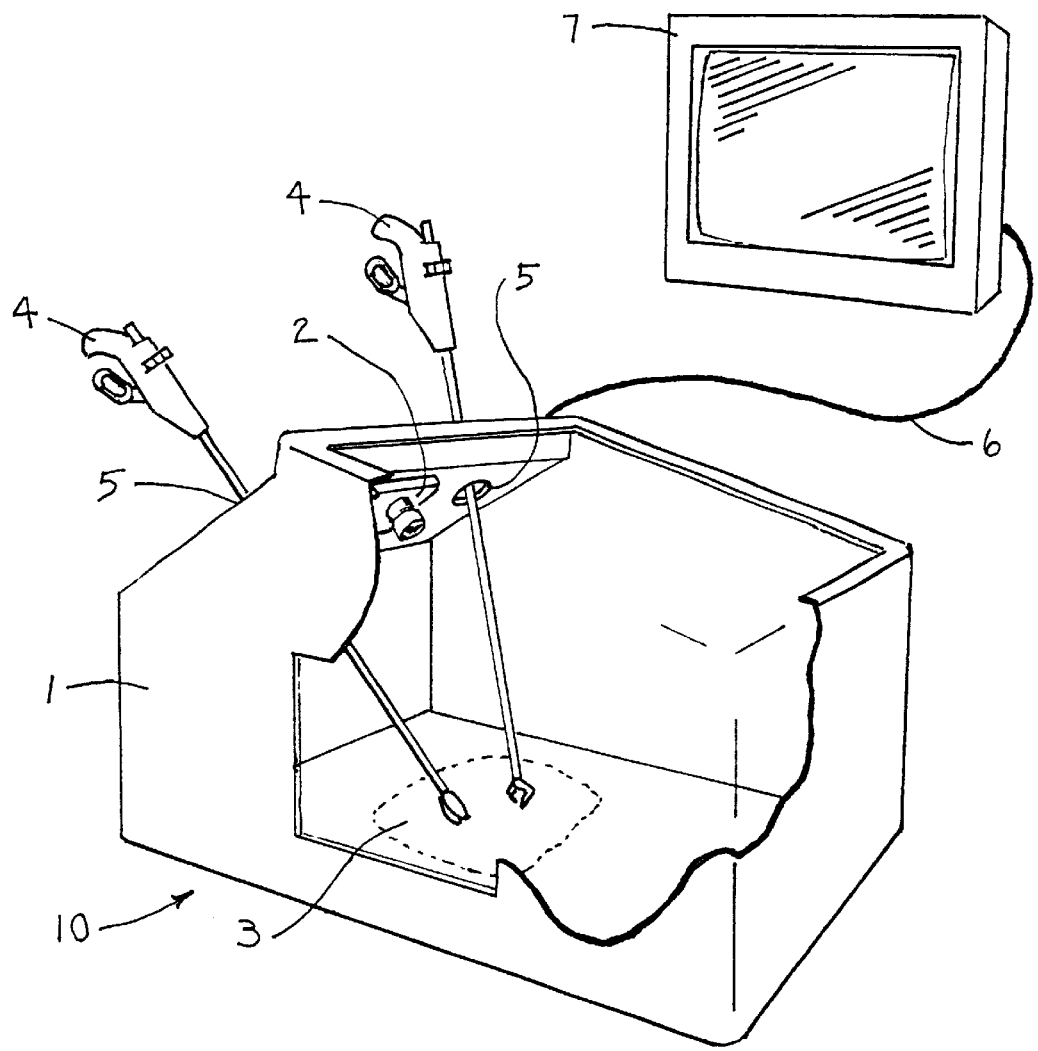
FIG. 1 is an elevated perspective view of the disclosed trainer in partial cross-section.

To fully understand and appreciate the laparoscopic trainer disclosed herein, reference should be made to the drawing. FIG. 1 is sufficient to depict all aspects and necessary elements of the trainer 10. It consists essentially of a box 1 or container forming the body of the trainer 10. The box is essentially an enclosure affording no direct view of its interior by the user. This container 1 can be fabricated of a variety of materials, but the desirability of lightness for portability strongly encourages the use of an air-filled material like polystyrene foam. The size of the trainer is not strictly mandated by any particular requirements, but the prototypical trainer is about 22" in length, 13.5" wide and about 13" high. Also, the functionality and portability of the container are neatly combined because the interior of the box will typically accommodate the monitor during transport and will typically be equipped with a strap or handle (not shown) to facilitate toting. The trainer 10 has at least two portals 5 or apertures, preferable in the front or anterior side or wall of the box for the insertion and manipulation of surgical instruments 4. Additionally, these portals 5 will typically be fitted with flexible grommets (not shown), which will, in turn, hold or support a pair of trocars for the insertion of endoscopic or laparoscopic instruments. These instruments may be any of a variety of surgical devices used for dissecting, suturing, ligating or for performing biopsies on retrieved tissue samples. As a practical matter, there is no reasonable limit to the procedures that can be demonstrated on the simulated tissue specimens placed or situated on the work area 3 of the trainer 10.

The work area 3 is characteristically a flat surface on the inner bottom of the box 1. Typically, it occupies an area of about 11" by 15". Also, within the confines of the box 1, is a video camera 2 for capturing, recording and transmitting the training activity transpiring on the specimen in the work area 3. The camera 2 is preferably mounted within the body of the trainer between the portals. The camera of the prototype is a model # svp-ov 15 ntsc color camera that captures an image, about six square inches, from the work area and serves the same function as an endoscopic camera. The prototypical camera, could be replaced by a digital imaging device, or similar image recorder, that is capable of capturing the activities on the work area.

The specimens or sample materials to be situated on the work area 3 could be real anatomical structures, but most likely they will be simulated tissues that are appropriate for the task or procedure to be performed. The prior art describes such simulated materials as providing realistic appearance and density, tactile feedback during manipulation and incision, and suitable for suturing and/or electro-cauterization using endoscopic instruments.

The interior of the box 1 is preferably illuminated to enhance the recording capabilities of the camera 2. The placement of the illumination means can be anywhere within the confines of the box 1, but currently a fluorescent lamp is situated on the lid or inner upper wall of the box. The only requirements of the light fixture is that it illuminate the work area, not interfere with the manipulation of the surgical instruments and remain out of the field of the camera.

The transmitted images are sent via cable 6 to a remote monitor 7 outside the box 1 for viewing by the individual operating the instruments 4 as well as by anyone interested in watching and/or instructing on the basis of what is being done on the work surface 3. If desired, the recorded image from the work area 3 could be transmitted to a large screen so that the trainer could play an integral role in teaching surgical techniques in a classroom environment.

Currently, the cable 6 is a simple electrical cable. It is connected to the monitor with an RCA phono-type 1 vp-p, 75 ohm plug, but future generations of the trainer could feature or employ a fiber optic cable.

The trainer 10 can also be equipped with a power strip, preferably located in the interior of the box 1 near the perimeter and at a distance from the work area 3. The power strip (not shown) would permit the trainer to be plugged into a single electrical outlet and accommodate electrical plugs from the camera, light and monitor.

While the foregoing is a complete and detailed description of the preferred embodiment of disclosed trainer, numerous variations and modifications may be employed to implement the all-important purpose of the disclosure without departing from the spirit of the invention; and, therefore, the elaboration provided herein should not be assumed to limit, in anyway, the scope of the invention, which is fairly defined by the appended claims.

What is claimed is:

1. A method of practicing laparoscopic surgical techniques on simulated tissue positioned on a work area within a portable surgical training device comprising a closed box having at least a pair of portals and a digital recording device, said method comprising:

inserting surgical instruments through said at least a pairs of portals;

manipulating said surgical instruments to practice said laparoscopic surgical techniques upon said simulated tissue;

recording the procedure of said laparoscopic surgical techniques on said digital recording device; and transmitting said recorded procedure of said laparoscopic surgical techniques to an external viewing means.

2. The method according to claim 1 wherein the external viewing means is a computer monitor.

3. The method according to claim 1 wherein the external viewing means is an LCD screen.

* * * * *